United States Patent [19]

Hicks

[11] Patent Number: 5,287,594
[45] Date of Patent: Feb. 22, 1994

[54] SHOPPING CART SWIVEL YOKE ASSEMBLY WITH PLASTIC BEARING RACES

[76] Inventor: Jimmy L. Hicks, 15654 Olive Branch, La Mirada, Calif. 90638

[21] Appl. No.: 895,116

[22] Filed: Jun. 8, 1992

[51] Int. Cl.⁵ .............................................. B60B 33/00
[52] U.S. Cl. .......................................... 16/20; 16/21; 16/36
[58] Field of Search ................... 16/20, 21, 22, 24, 25, 16/36

[56] References Cited

U.S. PATENT DOCUMENTS

| | | | |
|---|---|---|---|
| 3,231,926 | 2/1966 | Stollman | 16/22 |
| 3,837,039 | 9/1974 | Rehrig | 16/20 |
| 3,901,569 | 8/1975 | Uehara | 16/21 |
| 4,084,288 | 4/1978 | Black | 16/21 |
| 4,219,903 | 9/1980 | Black | 16/21 |
| 4,348,784 | 9/1982 | Fontana | 16/21 |
| 4,707,880 | 11/1987 | Doyle et al. | 16/21 |

FOREIGN PATENT DOCUMENTS 3512406 10/1985 Fed. Rep. of Germany ......... 16/20

Primary Examiner—Paula A. Bradley
Assistant Examiner—Chuck Y. Mah
Attorney, Agent, or Firm—Edgar W. Averill, Jr.

[57] ABSTRACT

An improved swivel yoke assembly for use on shopping carts. The yoke assembly is of the type having a steel yolk with forks which support a wheel. The yolk is permitted to swivel because it is supported between an upper and a lower set of ball bearings. The improvement comprises a polymeric bearing race below the upper set of ball bearings and a second polymeric bearing race above the lower set of ball bearings. The upper ball bearing race has a compound curve. The metal bearing races do not have to be heat treated and, thus, can be more accurately dimensioned. The assembly is better able to withstand the loss of lubricant in shopping cart washing operations.

10 Claims, 2 Drawing Sheets

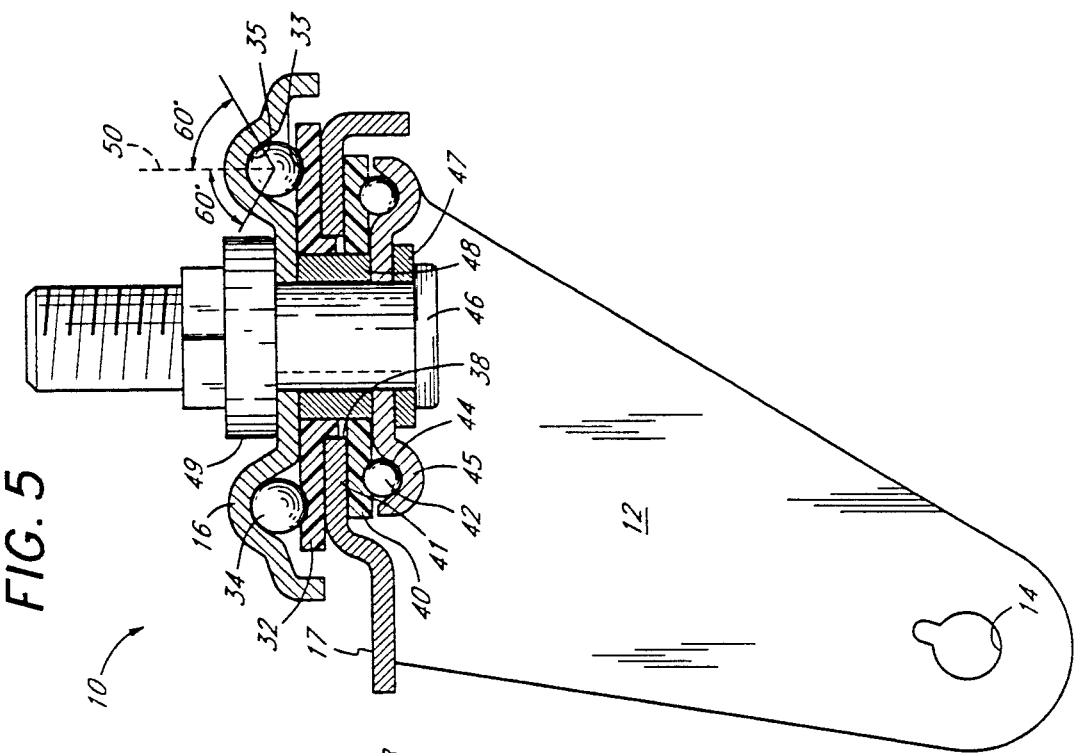
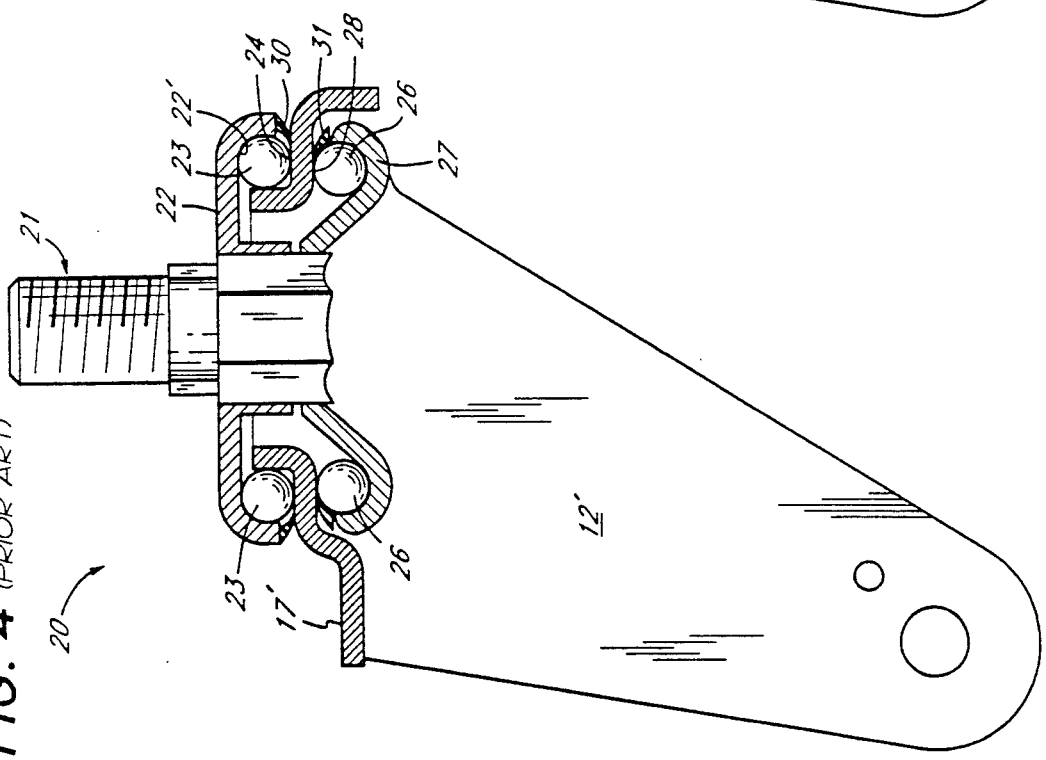

SHOPPING CART SWIVEL YOKE ASSEMBLY WITH PLASTIC BEARING RACES

BACKGROUND OF THE INVENTION

The field of the invention is casters, and the invention relates more particularly to swivel yoke assemblies of the type used on shopping carts.

There are several trends which have made the prior art swivel yoke assemblies less satisfactory. The first is the use of high pressure cleaning compounds which are ever more commonly used to wash shopping carts. Because of the spraying of the carts with detergent solutions under high pressure, the grease which is originally placed in the bearings tends to be removed. The result is a steel-on-steel contact on both sides of each ball bearing without lubrication which causes the swivel to become very hard to turn and very rough. Secondly, larger shopping carts are being made and are often used in warehouse type of retail outlets where the weight which each shopping cart wheel must bear is much greater than it was in the past.

The ball bearing races on shopping cart yokes have been heat treated in the past to increase their hardness so that the races could withstand the wear caused by the heavier loads. Unfortunately, the heat treating is not only expensive, but it also tends to cause warpage of the formed metal which, in turn, causes constant assembly problems because no two pieces of heat treated, formed races are identical. The result is that after extended periods of use and washing, many swivel yokes no longer swivel smoothly and a better swivel yoke design is needed.

SUMMARY OF THE INVENTION

The present invention is for an improved swivel yoke assembly for use on shopping carts of the type having a wheel-supporting steel yoke with a base from which two forks downwardly depend. A caster-supporting king pin extends upwardly from the base, and the base, in turn, is supported between an upper set of ball bearings and a lower set of ball bearings so that the base swivels with respect to the king pin. The upper set of ball bearings has an upper race and a lower race, and the lower set of ball bearings, likewise, has an upper race and a lower race. The improvement of the present invention comprises a polymeric lower race under the upper set of ball bearings and a polymeric upper race over the lower set of ball bearings. Preferably, the races have a groove at the area of contact of the ball bearings. The upper race above the upper set of ball bearings preferably has a compound curve which surrounds the top of each of the ball bearings, and the upper set of ball bearings preferably has a larger diameter than the lower set of ball bearings. Also, preferably, the lower race of the upper set of ball bearings is keyed with the base of the yoke so that it moves with the base of the yoke.

BRIEF DESCRIPTION OF THE DRAWINGS

FIG. 4 is a cross-sectional view of a prior art swivel caster assembly.

FIG. 5 is a cross-sectional view taken along line 5—5 of FIG. 1.

DESCRIPTION OF THE PREFERRED EMBODIMENTS

Figure 1:
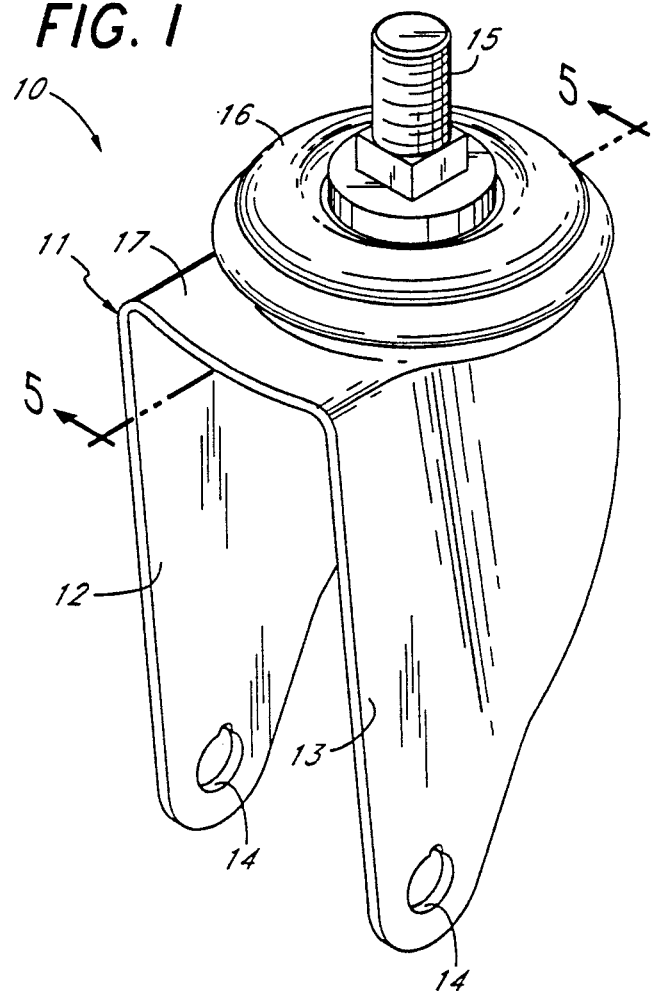
FIG. 1 is a perspective view showing the top, front and right side of the improved swivel yoke assembly of the present invention.

The improved swivel caster of the present invention is shown in FIG. 1 and indicated generally by reference character 10. Yoke assembly 10 has a wheel-supporting yoke 11 with a pair of downwardly depending forks 12 and 13. A rotatable wheel, not shown, is supported by a pair of axle openings 14 in a conventional manner. A king pin 15 extends upwardly, and this is used to affix the assembly to a shopping cart also in a conventional manner. The outer surface of the upper race is shown in FIG. 1 and indicated by reference character 16. A generally horizontal base between the forks 12 and 13 is indicated by reference character 17, and this is rotatably supported between two sets of ball bearings as shown in FIG. 5 of the drawings.

A prior art swivel yoke assembly is shown in FIG. 4 and indicated generally by reference character 20 Assembly 20 has a king pin 21 which supports an upper race member 22. A plurality of ball bearings 23 ride along the race portion 22' of upper race member 22. The lower race 24 of the upper set of ball bearings 23 is formed directly in the center of the generally horizontal base 17' of the yoke assembly. One of the downwardly depending forks is indicated by reference character 12', and the ball bearings are captured by an upturned collar 25.

The lower set of ball bearings 26 is held between a lower race member 27 and an upper race member 28 which is almost directly under the lower race of the upper set of ball bearings 23. The upper and lower set of ball bearings tend to create immense pressure at upper race 28 and lower race 24 requiring that this member be heat treated to increase its hardness. This heat treating process has three substantial shortcomings. First, it is a relatively expensive process. Secondly, heat treating causes dimensional changes in the formed metal which results in no two pieces being exactly the same after heat treating which, in turn, creates assembly problems and reduces the smooth action of the swivel. Thirdly, the heat treating step, since it hardens the surface, prevents zinc plating from penetrating the surface. This causes the yokes to be more susceptible to rust.

An upper rubber seal 30 and a lower rubber seal 31 are used to help decrease the tendency of grease to be washed out between the ball bearings. As stated above, there is an increased tendency to the use of high pressure washing machines which tend to impact the swivel yoke assembly from the side and also tend to wash out the lubricant.

The improved swivel yoke assembly of the present invention is shown in cross-sectional side view in FIG. 5. The generally horizontal base 17, rather than serving as the upper race of the lower set of ball bearings and the lower race of the upper set of ball bearings, merely supports two polymeric bearing race members. The upper bearing race member 32 has a lower race 33 which supports the upper set of ball bearings 34.

The upper set of ball bearings is also supported in an upper race 35 formed in the upper race member 16.

Figure 2:
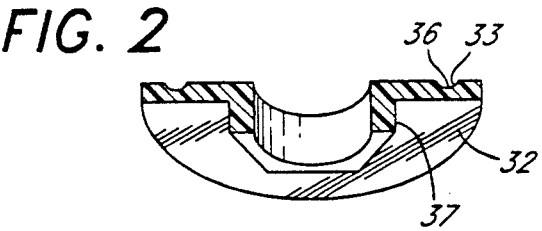
FIG. 2 is a perspective view of the lower race of the upper set of ball bearings of the assembly of FIG. 1.

Lower race member 32 is shown in perspective and cross-sectional view in FIG. 2 where it can be seen that it contains a race groove 36 which constitutes the race 33. Preferably, a hexagonal, downwardly depending portion 37 interlocks member 32 into a corresponding hexagonal opening 38 formed in base 17. This prevents the turning of member 32 with respect to base 17. This interlocked portion 37 is not essential, and the turning of member 32 with respect to base 17 can be prevented in most cases by roughening the under surface 32' of race member 32.

Figure 2A:
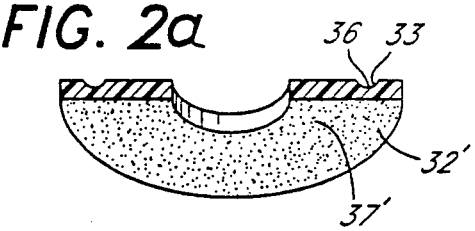
FIG. 2a is a perspective view partly in cross-section of an alternate embodiment lower race of the upper set of ball bearings of the assembly of FIG. 1.

An alternate configuration of race member 32 is shown in FIG. 2a and indicated by reference character 32'. Member 32' does not have an interlocked portion 37 but, instead, has a roughened surface 37' which has been found to be sufficient to prevent the turning of member 32' with respect to yoke 11. This surface is similar to the surface 40' described below.

Figure 3:
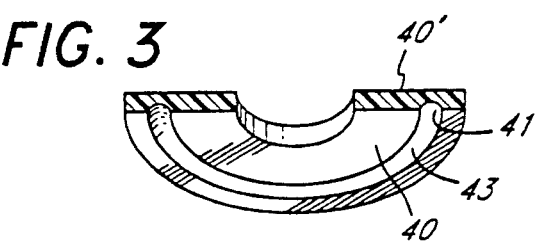
FIG. 3 is a perspective view, partly in cross-section, of the upper race of the lower set of ball bearings of the improved swivel assembly of FIG. 1.

The lower race member 40 has an upper race 41 for the lower set of ball bearings 42. Lower race member 40 is shown in FIG. 3 where it can be seen to have a groove 43 which forms the upper race 41 for ball bearings 42. The lower race 44 is formed in lower race member 45 and is supported between a metal washer 47 and a metal spacer 48. These members are firmly held as a unit against shoulder 49 by staked base 46. The upper surface 40' is preferably roughened to eliminate the tendency of race member 40 turning with respect to base 17.

The result of the use of polymeric race members makes the use of heat treating unnecessary. Since heat treating is not necessary, the compound curve in upper race member 16 provides an additional bearing surface for the upper set of ball bearings 34. As indicated in FIG. 5, this compound curve surrounds the top 50 and extends an arc of at least 45° and preferably about 60° on each side of top 50. With no heat treating, the dimension formed in member 16 is far more accurate and stable than member 22 of FIG. 4. It should be noted that the lower set of ball bearings 42 are the smaller diameter than the upper set of ball bearings 34 which helps compensate for the space used by the polymeric race members.

The result of the design of the member of FIG. 5 is that a far smoother action results and, furthermore, the assembly is more capable of operating without grease. The assembly of FIG. 5 was subjected to a 500-mile test which subjects the assembly to rotation and jarring. The old type of yoke, shown in FIG. 4, was practically nonusable after 500 test miles, whereas the yoke of the present invention was like new after the 500-mile test.

The bearings shown in FIGS. 2 and 3 are preferably fabricated from nylon 6—6 which, of course, is a polyamide polymer.

The shopping cart market is unique for caster problems. First of all, the high pressure washing is not common for other types of casters. Secondly, the casters are not limited to movement on a smooth surface, but often used on rough asphalt in the parking lots of such markets. The amount of weight and turning speed is also very inconsistent and, thus, casters which can last for years in industrial applications are not capable of withstanding the rigors of shopping cart usage. Furthermore, the pricing of such caster assemblies is highly competitive, and the assembly must be capable of low cost production.

The present embodiments of this invention are thus to be considered in all respects as illustrative and not restrictive; the scope of the invention being indicated by the appended claims rather than by the foregoing description. All changes which come within the meaning and range of equivalency of the claims are intended to be embraced therein.

What is claimed is:

1. An improved swivel yoke assembly for use on shopping carts of the type having a wheel-supporting, steel yoke with two downwardly depending forks and a generally horizontal base between the forks, said base having an upper surface and a lower surface, a caster supporting king pin extending upwardly from said base, said base being supported between a lower set of ball bearings and an upper set of ball bearings, said upper set of ball bearings being held between an upper race and a lower race, and said lower set of ball bearings being held between an upper race and a lower race, wherein the improvement comprises:

a polymeric lower race under the upper set of ball bearings, said polymeric lower race under the upper set of ball bearings being supported on the upper surface of said generally horizontal base of said steel yoke; and a polymeric upper race over the lower set of ball bearings, said polymeric upper race over the lower set of ball bearings being supported on the lower surface of said generally horizontal base of said steel yoke.

2. The improved swivel yoke assembly of claim 1 wherein said polymeric lower race under the upper set of ball bearings has an upwardly-directed race groove.

3. The improved swivel yoke assembly of claim 1 wherein said polymeric upper race over the lower set of ball bearings has a downwardly-directed race groove.

4. The improved swivel yoke assembly of claim 1 wherein said upper race of said upper set of ball bearings is curved over the top and both sides of said upper set of ball bearings.

5. The improved swivel yoke assembly of claim 4 wherein said upper race of said upper set of ball bearings is curved more than 45° on each side of the top of said ball bearings.

6. The improved swivel yoke assembly of claim 1 wherein said lower race of said upper set of ball bearings is keyed with said generally horizontal base of said wheel supporting yoke so that it turns with said base.

7. The improved swivel yoke assembly of claim 1 wherein said upper set of ball bearings has an upper ball diameter, and said lower set of ball bearings has a lower ball diameter, and said lower diameter is smaller than said upper diameter.

8. The improved swivel yoke assembly of claim 1 wherein there is a metal spacer between said upper race of said upper set of ball bearings and the lower race of said lower set of ball bearings.

9. An improved swivel yoke assembly for shopping carts of the type having a steel yoke with a pair of forks depending downwardly from a yoke base, said yoke base having an upper surface with a lower surface and being rotatably supported between an upper set of ball bearings and a lower set of ball bearings, said upper set of ball bearings having an upper race member and lower race, and said lower set of ball bearings having an upper race and lower race member, and the upper race member of said upper set of ball bearings and said lower race member of said lower set of ball bearings being supported on a swivel yoke supporting king pin, wherein the improvement comprises:

said lower race member of said upper set of ball bearings is fabricated from a polymer and is supported on the upper surface of said yoke base and is a separate added member from said yoke base; and said upper race member of said lower set of ball bearings is fabricated from a polymer and is supported on the lower surface of said yoke base and is a separate added member from said yoke base.

10. The improved swivel yoke assembly of claim 9 wherein said upper race member of said lower set of ball bearings is fabricated from a polyamide polymer.

* * * * *